United States Patent [19]

Schenten

[11] Patent Number: 4,583,789
[45] Date of Patent: Apr. 22, 1986

[54] REAR SPRING ACTUATED BRAKE PROPORTIONER

[75] Inventor: James L. Schenten, Sterling Heights, Mich.

[73] Assignee: Chrysler Corporation, Highland Park, Mich.

[21] Appl. No.: 686,359

[22] Filed: Dec. 26, 1984

[51] Int. Cl.[4] .............................................. B60T 8/18
[52] U.S. Cl. .................................. 303/22 R; 188/195; 267/54 R
[58] Field of Search ............. 188/195, 349; 303/22 R, 303/6 C, 22 A, 23 A, 23 R; 267/54, 36

[56] References Cited

U.S. PATENT DOCUMENTS 4,012,079 3/1977 Takeshita ...................... 303/22 R X
4,445,725 5/1984 Sivulka .......................... 303/22 R X

FOREIGN PATENT DOCUMENTS 957878 5/1964 United Kingdom ............. 303/22 R

Primary Examiner—Douglas C. Butler
Attorney, Agent, or Firm—Kenneth H. MacLean, Jr.

[57] ABSTRACT

An improved braking system, particularly for a vehicle such as a truck, subject to relatively large differences in loading, including a force responsive proportioning valve inserted between a master brake cylinder and the rear brakes for increasing the rear braking effort relative to the front as the load on the vehicle increases. A spring position follower device is operably connected to the force input of the proportioning valve to respond to angular movements of the pivotally mounted end portion of the rear leaf spring whereby an increased input force is transmitted to the proportioning valve as the spring flexes due to vehicle load increases.

5 Claims, 5 Drawing Figures

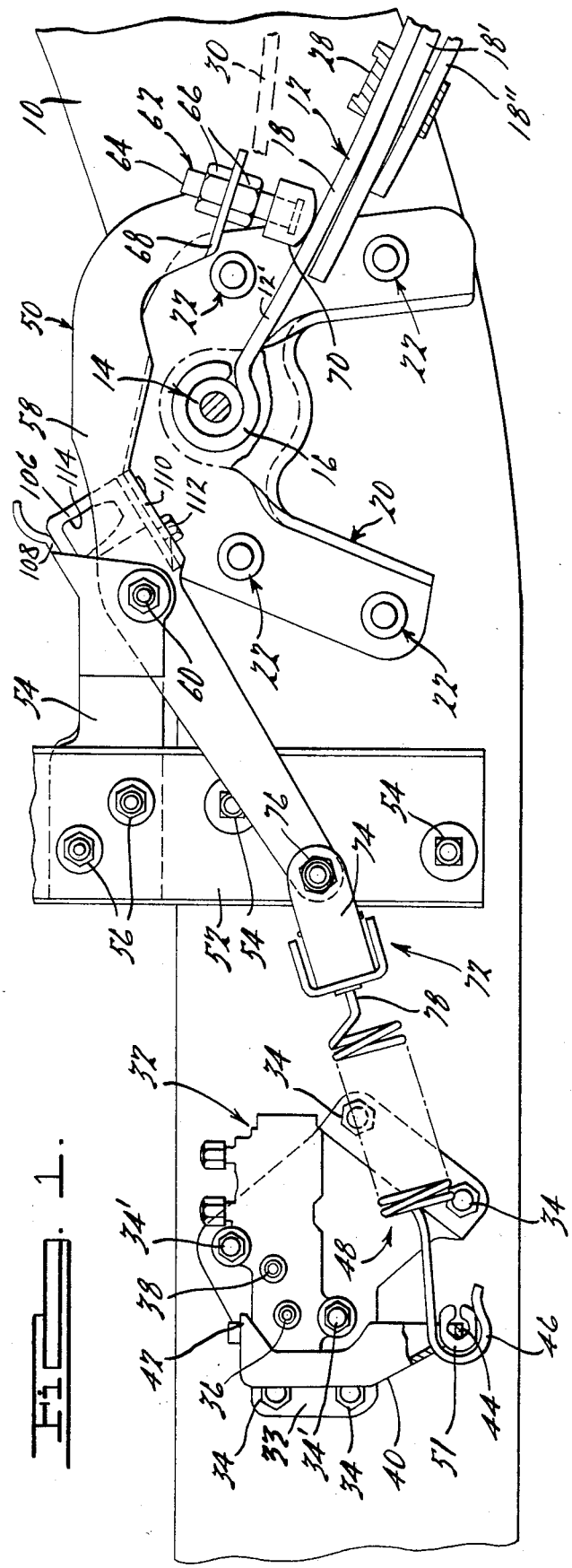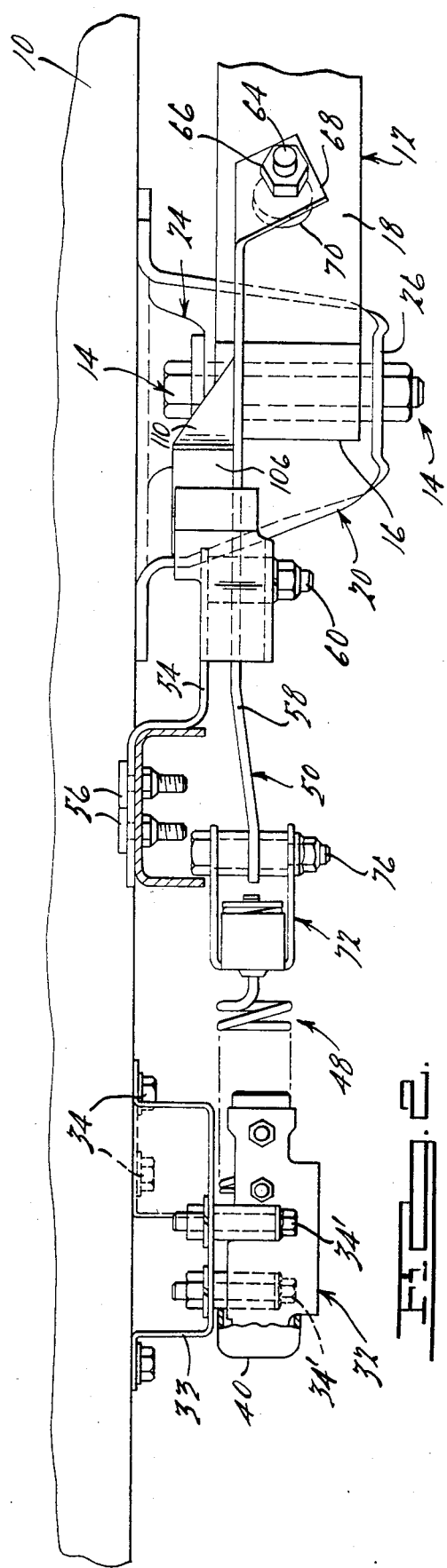

REAR SPRING ACTUATED BRAKE PROPORTIONER

BACKGROUND OF THE INVENTION

This application relates to an improved brake system for a vehicle, particularly one which is subject to significant variable loading, such as a truck. The brake system utilizes a proportioning valve between the master cylinder and the rear brakes. Its purpose is to increase the braking effect of the rear brakes as the vehicle is loaded. Conversely, the valve decreases the rear braking effect when the vehicle load decreases.

Prior use of a rear brake proportioning valve include the 1984–1985 Chrysler Corporation built T-115 van and wagon, namely the Plymouth "Voyager" and the Dodge "Minivan" and "Caravan." In these vehicles, a proportioning valve is attached to a body cross member slightly forward of the rear axle and slightly to the left of the vehicle center line. A lever assembly is attached to the rear axle rightward of the proportioning valve and projects upward from the axle. An elongated tension-type spring extends between the lever assembly and the proportioning valve. When the vehicle is lightly loaded, the position of the lever end of the tension spring is only slightly higher than the proportioning valve end. As vehicle load increases, the valve end moves further downward with respect to the lever end and, thus, extends the spring resulting in an increased force applied to the proportioning valve. Resultantly, the valve directs increased fluid pressure to the rear brakes for greater rear braking.

The aforedescribed brake system operates satisfactorily. However, the mid-axle location of the valve, spring and lever assembly is not possible on some vehicles due to space considerations and interference with other parts. Also, this particular arrangement on the T-115 is somewhat inconvenient since the spare tire is stored immediately to the rear of these components. It would improve the accessibility of the spare tire if these brake components were located elsewhere.

It is important to place the proportioning valve where it is protected. It has been found that a desirable location for the valve is just forward of the rear wheel and up near the forward end portion of the rear leaf-type suspension spring. This is where the forward end of the leaf spring is pivotally connected to the vehicle. In this location, the proportioning valve can be supported by the same longitudinal body or chassis member which also supports the spring end. The input device for the valve which senses vehicle loading and includes a suspension spring position sensing means is directly responsive to movements of the leaf spring end.

The extent of vehicle load in the subject application is sensed by a position follower device which is operably connected to the forward end portion of the rear suspension spring. As the vehicle load increases, the spring's end portion is pivoted through an arc as the vehicle body and attached spring portion move downward with respect to the spring mid-portion. A position follower member for the end portion of the spring includes an elongated lever means which is supported for pivotal movement at a mid-location and about an axis generally parallel to the axis about which the spring end portion pivots in response to load changes. The more rearward portion of the follower extends past the pivotal support of the spring and overlies the spring end. A contact device on the end of the rearwardly extending portion rests against the top surface of the spring and generates angular pivoting of the lever means about its midpoint mount. The forward portion of the follower lever is normally directed slightly downward from the horizontal. As the vehicle load is increased, the follower lever pivots to move the forward end further downward.

A spring-like and axial connector extends from the forward end of the follower lever to the input control of the proportioning valve which is force responsive. As the follower pivots due to loading of the vehicle, the force input to the proportioning valve is increased by extension of the spring connector. Resultantly, an increased brake pressure is directed to the rear brakes.

The spring contact device on the end of the follower lever is held against the upper surface of the spring by means of a yieldable bias control device. This device includes a molded rubber bumper-like member with a hollowed mid-portion which is positioned next to the follower lever's pivot and slightly rearwardly toward the spring contact device. As vehicle loading is increased, the suspension spring causes the pivoting of the lever against the hollow bumper member. Resultant yieldable distortion of the bumper into a more flattened configuration produces a return bias on the lever. When the load is decreased, the bumper and spring-like connector cooperate to pivot the lever and contact device against the suspension spring.

Therefore, an object of the invention is to provide an improved vehicle brake proportioning system which utilizes a vehicle load sensing means operating directly in response to movements of a vehicle rear suspension spring for controlling an input of a proportioning valve in the fluid circuit of the brake system.

A further object of the invention is to provide an improved vehicle brake proportioning system which utilizes a vehicle load sensing means operating directly in response to movements of the end portion of the rear suspension spring so as to pivot along with the end of the spring as it responds to increased vehicle loading and transmits load inputs via an axially yieldable, spring-like connector to the proportioning valve.

Other objects and advantages of the subject invention will be readily apparent from a reading of the following detailed description of the preferred embodiment, which is shown in the following drawings.

DESCRIPTION OF THE DRAWINGS

FIG. 1 is an elevational and partially sectioned view of the brake proportioning valve and associated vehicle level sensing components; and FIG. 2 is a planar and partially sectioned view of the brake proportioning valve and associated vehicle level sensing components.

In FIGS. 1 and 2, a longitudinally extending (fore and aft) frame member 10 of a vehicle is illustrated. The illustrated portion of frame 10 is located just forward of the rear axle (not shown). The rear axle is supported by springs of leaf-type construction and a forward end portion 12' of a leaf spring assembly 12 is shown in FIG. 1. The end portion 12' is pivotally supported by a fastener means 14 which extends through an eye portion 16 formed in the end of the main or uppermost leaf of the spring assembly 12. The fastener 14 extends between spaced portions of a bracket means 20 which is attached to the frame member 10 by fasteners 22. Specifically, the bracket means 20 also includes a wall portion 24 which is outwardly offset from the frame member 10 and which engages one end of the fastener 14. Another outwardly offset wall portion 26 supports the other end of the fastener 14.

Figure 3:
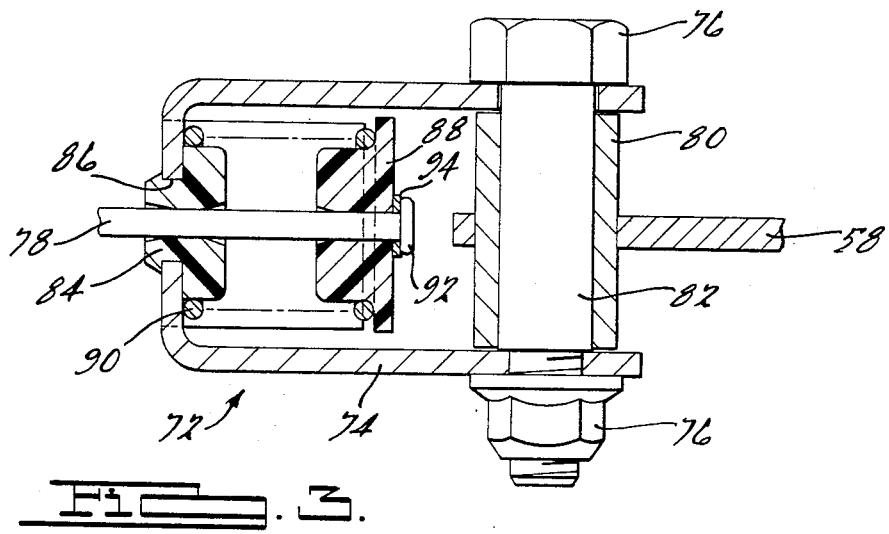
FIGS. 3 and 4 are sectioned views of two different modifications of the connection between the proportioning valve and the level sensing lever generally shown in FIGS. 1 and 2.

The leaf spring assembly 12 is commonly utilized in the rear suspension of front and rear-wheel drive type vehicles. The assembly 12 includes the main leaf 18 which has a circularly formed end portion 16 for pivotal attachment to the frame. Assembly 12 also includes auxiliary leaf members, such as 18' and 18" which extend substantially the length of the leaf spring, but are not themselves directly fastened to the frame member 10. The leaf portions 18, 18', 18" of the assembly 12 are secured together by clamp means 28 as well as by a clamping (not shown) near the center of the leaf spring assembly where the axle contacts the spring mid-portion. This is conventional in many vehicle rear suspensions. As is well known about vehicle suspensions, an increased load or cargo in vehicles causes the sprung weight or frame 10 and the attached end portions of the spring to move downward with respect to the fixed central portion of the spring assembly which is attached to the axle. For example, the spring assembly 12 is shown in a normally lightly loaded arcuate shape in FIG. 1. As the load is increased, the spring 18 is straightened and a fully loaded position of the spring 18 is illustrated by numeral 30 in FIG. 1.

As previously indicated, it is desirable to provide a brake proportioning system in vehicles which are subject to large variations in loading. The proportioning system produces a substantially decreased braking capacity by the rear wheels when the vehicle is lightly loaded. The rear wheel braking capacity is significantly increased when the vehicle load is increased. As shown in FIGS. 1 and 2, a brake proportioning valve assembly 32 is mounted on the frame member 10 in a position forward of the spring assembly 12. Specifically, the brake proportioner 32 is fastened to a bracket 33 which is attached to frame member 10 by fasteners 34. Valve 32 includes a brake fluid inlet 36 for receiving pressurized fluid from the master brake cylinder of the vehicle. It also includes a fluid outlet 38 which is directed to the left and the right wheel cylinder assemblies.

Brake proportioning valves for vehicles similar to assembly 32, have been utilized on vehicles previously. The interior works and function thereof is known. Basically, the brake proportioner valve is a force responsive or input device having interior valve components for each of the rear wheel brake cylinders. The hydraulic fluid pressure received through the valve inlet is regulated thereby and directed to the rear wheel cylinders of the vehicle brake system. A lever-type input actuator 40 is pivotally attached at its upper end 42 to one end of the valve 32 where it may pivot thereabout. A lower end portion 44 of lever 40 is operably connected by a hooked end portion 46 to a spring connector 48. Spring connector 48 extends from the lever end 44 to a suspension spring position follower assembly 50. To ensure smooth engagement between the hooked end portion 46 of the spring 48 and the end 44 of lever 40, a contoured fastener member 50 is utilized therebetween.

As previously indicated the spring connector 48 extends between lever 40 and a spring position follower as illustrated in FIGS. 1 and 2. The position follower includes support bracket 52 extending upwardly from frame member 10. It is attached threto by fasteners 54. The upper portion of member 52 extends above the frame member 10 to support a horizontal bracket 54 which is fastened thereto by fasteners 56. The bracket 54 pivotally mounts an elongated spring position lever 58. Lever 58 is pivotally supported at a central position by a fastener 60. The rearward end portion of lever 58 (to the right in FIGS. 1,2) engages an adjustable spring contact assembly 62. Assembly 62 includes a threaded shaft 64 with nut-type fasteners 66 on either side of a turned end portion 68 of the lever. The fasteners 66 capture the threaded member 64 in a desired axial position relative to lever 58 and spring leaf 18. The lower end of the threaded shaft 64 carries an elastomeric cup or spring contact member 70 which engages and moves with the spring position. This causes the lever 58 to be pivoted about the axis of fastener 60. The forward end (to the left) of the lever 58 is connected to spring assembly 48 and, more specifically, by means of a caged spring assembly 72. The caged spring assembly 72 includes a generally "U" shaped body 74 pivotally attached to the end of the lever 58 by a fastener 76. An end portion 78 of the spring 48 extends into the caged spring assembly 72. For more details of this assembly, reference is hereby made to FIG. 3.

In FIG. 3, the caged spring assembly 72 includes a generally "U" shaped member 74 which is pivotally attached to the lever 58 by fastener 76. Specifically, fastener 76 extends through a cylindrical sleeve 80 supported on the end of lever 58. The mid-portion 82 of fastener 76 is of enlarged diameter so that a relatively great cylindrical surface bearingly engages the sleeve 80. The end 78 of spring assembly 48 projects through a bushing 84 which is supported in an opening 86 of the housing 74 and then extends centrally through a spring 90 and through a second retainer member 88. The retainer 84 and 88 engage the ends of the spring 90. The end portion 92 of the spring 78 is then so formed that rightward movement of retainer 88 due to the influence of spring 90 is prevented. Also, a small annular bearing member 94 is placed between the end 92 and the retainer 88.

Figure 4:
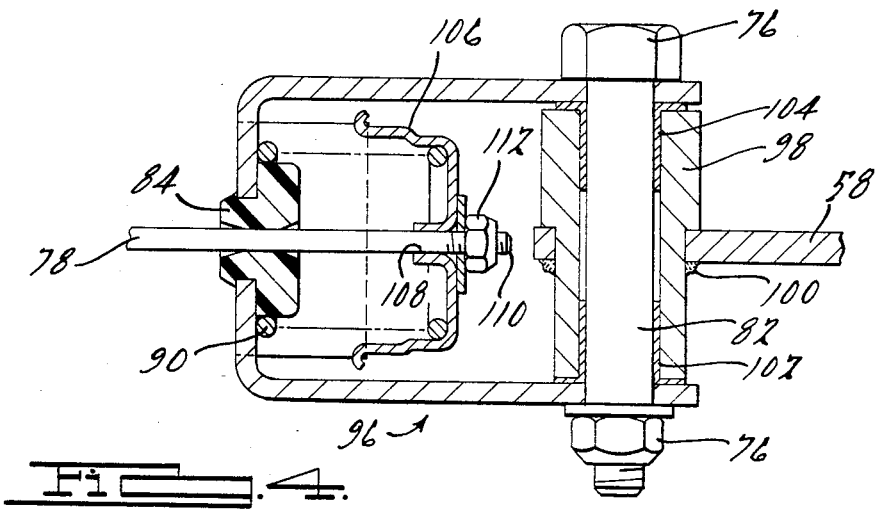

In FIG. 4, a functionally similar spring assembly 96 is illustrated. Again, lever 58 supports a tubular bushing or sleeve bearing member 98 which is retained thereto by weld 100. The central portion 82 of the retainer 76 is encircled by two friction-reducing sleeves 102, 104. As in FIG. 3, the spring end portion 78 extends through a retainer member 84 and then axially through a spring 90. The other end of spring 90 is retained by a generally cup-shaped retainer 106 including a central bore 108 formed therein. The threaded end portion 110 secures the member 106 by a nut-type fastener 112 thereon.

Figure 5:
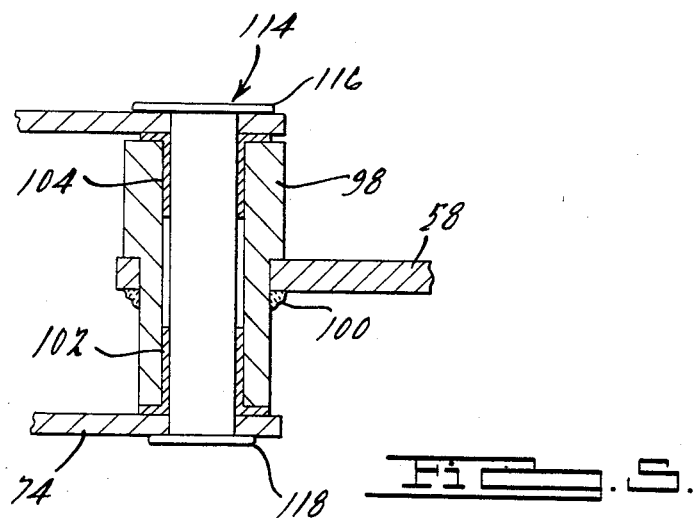
FIG. 5 is a sectioned view of a modification of the connectors shown in FIGS. 3 and 4.

FIG. 5 shows a modification to the device of FIG. 4 in the pivotal connection between lever 58 and the spring assembly. Specifically, the bolt type fastener shown in FIGS. 3 and 4 is replaced by a rivet-type connector 114 with flattened ends as at 116 and 118 over the housing member 74 of the assembly. As in the embodiment shown in FIG. 4, the connection utilizes a sleeve identified by the numeral 98 which is attached by a weld 100 to the lever 58. Like the embodiment of FIG. 4, two friction reducing members 104 and 102 are utilized.

OPERATION OF THE BRAKE PROPORTIONER

When a vehicle, such as a truck, is lightly loaded (with only a driver for instance), vehicle braking is more efficient when the front wheel brakes assume a large share of the braking capacity needed to stop. Conversely, when a vehicle is heavily loaded, it is usual that this heavy load weighs disproportionately more on the rear wheels of the vehicle. Therefore, greater braking of the rear wheels provide more efficient stopping power for the vehicle. The subject load sensing and brake proportioning system operates in conjunction with an otherwise conventional hydraulic master brake control which generates a given pressure level of brake fluid for both front and rear brakes. In the present brake system, a brake proportioning valve is responsive to the variable loading of the vehicle whereby when the vehicle is lightly loaded, lower brake pressure is transmitted from the master cylinder to the rear brakes, than to the front brakes. Consequently, the front brakes provide a disproportionate greater braking effort under light load conditions. When the vehicle is heavily loaded, a higher brake pressure level is transmitted from the master cylinder to the rear brakes, therefore, providing greater braking efforts under heavier load conditions.

The increased load on the vehicle, particularly the rearward load bed thereof, results in counter-clockwise pivoting of the end portion 18 of spring 12 of FIG. 1. Resultantly, the contact device 62 and position follower lever 58 are pivoted counterclockwise about fastener 60. This pivoting of lever 58 will move a rubber bumper 106 against a stopper wall 108. Bumper 106 moves a rubber bumper against a stopper wall 108. Bumper 106 is supported on a platform extension 110 of lever 58 and attached thereto by fastener 112. The bumper 106 is molded in a form including a hollow central portion 114 to facilitate controlled flattening distortion thereof as the lever pivots counter-clockwise relative to member 54 and stopper wall 108. When the vehicle load is decreased or during a transient flexing (pivoting) of the suspension spring, the bumper 106 tends to bias the lever clockwise to maintain contact between spring 18 and member 70.

Pivoting motion of lever 58 about the axis of fastener 60 in a counterclockwise manner causes the leftward end of lever 58 to elongate the spring connector 48. The resultant force transmitted by connector 48 acts on the input lever 40 of the proportioning valve 32. As the force on lever 40 increases, the transmitted brake fluid pressure level is increased to produce increased braking effects from the rear wheel brake components relative to the front wheel brake components. Conversely, when the spring position lever pivots clockwise from a relatively heavy load position to a lighter load position, the spring connector 48 contracts axially and exerts a decreased force on input lever 40. Resultantly, the proportioning valve 32 transmits a decreased brake pressure level to the rear wheel components.

The spring connector assemblies illustrated in FIGS. 3 and 4 share a common feature. Both utilize a small compression type spring in series with the larger tension type spring 48. The purpose of the smaller spring is to maintain contact between the contact device 70 of the lever 58 and the surface of spring 12 during transient flexing thereof, such as caused by highway irregularities. The ratio of the spring rates between the larger tension spring and the compression spring in a preferred embodiment is about 5 or 6 to 1.

Although only one basic embodiment of the subject improved brake system with spring position follower means has been illustrated and described in detail, modifications thereto are contemplated without falling outside the scope of the invention as claimed hereafter.

What is claimed is as follows:

1. In a vehicle, an improved brake and suspension system including a leaf-type rear spring with one end portion attached to the sprung portion of the vehicle for pivotal movements thereabout and with a mid-portion attached to the unsprung rear wheel assembly, a master brake pressure generating control means for selectively generating brake fluid pressure, brake components associated with each wheel adapted to receive the brake fluid pressure, a proportioning valve means fluidly operative between the master brake control and the rear wheel brake components to regulate the level of fluid pressure transmitted to the latter and controlled by a force input produced in response to loading of the vehicle, an improved vehicle load sensing means, comprising:

bracket means mounted adjacent the one end of the spring;

an elongated lever pivotally supported near its mid-portion by the bracket means so as to position one end portion of the lever in spaced overlying relation to the one end portion of the spring near its attachment to the vehicle sprung portion;

a second end portion of the lever being operably connected to the force input of the proportioning valve means whereby as the one end portion of the spring moves about its attachment to the sprung portion of the vehicle in response to changes in vehicle loading, the lever is pivoted therewith to transmit a force input to the input of the proportioning valve;

an elongated and axially yieldable means operably connecting the second end of the lever and the proportioning valve to permit substantial movements of the second end of the lever in relation to the proportioning valve in response to changes in vehicle loadings thereby transmitting a resultant force to the proportioning valve corresponding to elongation of the yieldable means.

2. In a vehicle, an improved brake and suspension system including a leaf-type rear spring with one end portion attached to the sprung portion of the vehicle for pivotal movements thereabout and with a mid-portion attached to the unsprung rear wheel assembly, a master brake pressure generating control means for selectively generating a fluid pressure, brake components associated with each wheel adapted to receive the fluid pressure, a proportioning valve means fluidly operative between the master brake control and the rear wheel brake components to regulate the level of fluid pressure transmitted to the latter and controlled by a force input produced in response to loading of the vehicle, an improved vehicle load sensing means, comprising:

bracket means mounted to the vehicle sprung portion adjacent the one end of the spring;

an elongated lever pivotally supported near its mid-portion by the bracket means so as to align one end portion of the lever in overlying relation to the one end portion of the leaf-type spring;

spring contact means mounted on the one end portion of the lever with an end portion thereof engaging the upper surface of the spring near the one end portion thereof and being adjustable with respect to the spring;

a second end portion of the lever being operably connected to the force input of the proportioning valve means whereby as the one end portion of the spring moves in response to changes in vehicle loading, the lever is pivoted therewith to transmit a force input to the input of the proportioning valve;

a deformable elastomeric bumper captured between the lever and the bracket means so that pivoting of the lever due to increased vehicle loading is yieldably resisted by its deformation thereby the lever contact means is urged against the spring, particularly during the transient spring movements due to highway irregularities;

an elongated and axially yieldable means operably connecting the second end of the lever and the proportioning valve to permit substantial movements therebetween responsive to changes in vehicle loading;

the yieldable means having first and second spring means in series connection so that initial elongation thereof first loads the first spring followed by subsequent loading of the second spring whereby increased loading of the two springs produces a progressively increased force input on the proportioning valve for regulating the brake pressure level transmitted to the rear brake components.

3. The improved system set forth in claim 2 in which the ratio of spring rates between the two springs of the yieldable means is between 5 and 6 to 1.

4. The improved system set forth in claim 2 in which the elastomeric bumper is configured with a hollow mid-portion to provide controlled deformation thereof characterized by collapse of one end wall toward the other.

5. The improved system of claim 2 in which the elongated yieldable means includes a relatively heavy coil-type spring in tension with one end thereof configured to connect directly to the proportioning valve and a second end operably connected to a caged spring assembly, including a relatively light spring, the light spring being contacted by retainer means at either end configured and located to compress the light spring with elongation of the yieldable means, the second end of the relatively heavy spring extending through the central portion of each retainer and configured to freely move in the axial direction in one retainer and to act upon the second retainer to produce compression of the light spring, the one retainer being operatively connected to the second end of the elongated lever.

* * * * *